United States Patent
Mochida et al.

(10) Patent No.: US 8,971,882 B2
(45) Date of Patent: Mar. 3, 2015

(54) BASE STATION DEVICE, TERMINAL DEVICE, RECEIVER-SIDE BASE STATION DEVICE, AND WIRELESS COMMUNICATION METHOD

(75) Inventors: Eiji Mochida, Osaka (JP); Kenichi Murakami, Osaka (JP)

(73) Assignee: Sumitomo Electric Industries, Ltd., Osaka-shi, Osaka (JP)

( * ) Notice: Subject to any disclaimer, the term of this patent is extended or adjusted under 35 U.S.C. 154(b) by 196 days.

(21) Appl. No.: 13/579,674

(22) PCT Filed: Jan. 13, 2011

(86) PCT No.: PCT/JP2011/050451
§ 371 (c)(1),
(2), (4) Date: Aug. 17, 2012

(87) PCT Pub. No.: WO2011/118242
PCT Pub. Date: Sep. 29, 2011

(65) Prior Publication Data
US 2012/0315956 A1    Dec. 13, 2012

(30) Foreign Application Priority Data

Mar. 23, 2010  (JP) ................................ 2010-065988

(51) Int. Cl.
*H04W 88/08*    (2009.01)
*H04J 11/00*    (2006.01)
(Continued)

(52) U.S. Cl.
CPC ............. *H04W 88/08* (2013.01); *H04J 11/005* (2013.01); *H04W 28/04* (2013.01); *H04W 28/048* (2013.01); *H04W 68/00* (2013.01); *H04W 84/045* (2013.01)
USPC ........................... 455/434; 455/458; 455/561

(58) Field of Classification Search
CPC ... H04J 11/005; H04W 28/04; H04W 28/048; H04W 68/00; H04W 84/045; H04W 88/08
USPC ................ 455/422.1, 423, 424, 456.1, 456.2, 455/63.1, 69, 522, 550.1, 561.2, 434, 435.1, 455/458, 561, 462.1
See application file for complete search history.

(56) References Cited

U.S. PATENT DOCUMENTS

2007/0042799 A1* 2/2007 Jubin et al. .................... 455/522
2007/0099633 A1* 5/2007 Bamberger et al. ........ 455/456.2
(Continued)

FOREIGN PATENT DOCUMENTS

| CN | 101449606 A | 6/2009 |
|---|---|---|
| WO | 2008/093100 | 8/2008 |
| WO | 2009/022533 | 2/2009 |

OTHER PUBLICATIONS

Nobuyoshi Kikuma, "Adaptive Signal Processing Using Array Antennae," Kagaku Gijutsu Shuppan, Nov. 25, 1998, pp. 1-346, including the concise explanation of the relevance in English.
(Continued)

*Primary Examiner* — Thanh Le
(74) *Attorney, Agent, or Firm* — Drinker Biddle & Reath LLP

(57) ABSTRACT

When installing a femto base station device 1b, failure that may occur in wireless communication is suppressed. The femto base station device 1b includes an RF unit 4 which transmits broadcast information or paging information to a femto terminal device 2b communicating with the femto base station device 1b, and an information storage unit 31 which adds and stores, in the broadcast information or the paging information, location information that relates to the location of the femto base station device 1b and is used by another wireless communication device to suppress interference.

10 Claims, 13 Drawing Sheets

(51) Int. Cl.
*H04W 28/04* (2009.01)
*H04W 68/00* (2009.01)
*H04W 84/04* (2009.01)

(56) References Cited

U.S. PATENT DOCUMENTS

2007/0270151 A1    11/2007  Claussen et al.
2008/0188265 A1*    8/2008  Carter et al. .................. 455/561
2012/0009936 A1*    1/2012  Ishii et al. .................. 455/456.1

OTHER PUBLICATIONS

3GPP TS36.331, 3rd Generation Partnership Project; "Technical Specification Group Radio Access Network; Evolved Universal Terrestrial Radio Access (E-UTRA); Radio Resource Control (RRC); Protocol specification (Release 10)", 2010, pp. 1-276.

Network Dictionary, [online], [retrieved on Jul. 17, 2012], retrieved from the Internet: <URL:http://itpro.nikkeibp.co.jp/word/page/10008605/>, including partial English translation of mention about "Broadcast Information".

* cited by examiner

FIG. 11

```
SystemInformationBlockType14-v10x0-IEs ::= SEQUENCE { eNBLocationInformation OCTET STRING (SIZE(13))

nonCriticalExtension SEQUENCE {}
}
```

FIG. 13

```
Paging ::= SEQUENCE {
    pagingRecordList PagingRecordList
    systemInfoModification ENUMERATED {true}
    etws-Indication ENUMERATED
    nonCriticalExtension Paging-v9x0-IEs
}
Paging-v9x0-IEs ::= SEQUENCE {
    cmas-Indication-r9 ENUMERATED {true}
    nonCriticalExtension Paging-v10x0-IEs
}
Paging-v10x0-IEs ::= SEQUENCE {
    eNBLocationInformation OCTET STRING (SIZE(13))
    nonCriticalExtension SEQUENCE {}
}
```
(ADDED PART)

BASE STATION DEVICE, TERMINAL DEVICE, RECEIVER-SIDE BASE STATION DEVICE, AND WIRELESS COMMUNICATION METHOD

TECHNICAL FIELD

The present invention relates to a base station device that performs wireless communication with terminal devices, a terminal device, a receiver-side base station device that receives a signal from the base station device, and a wireless communication method.

BACKGROUND ART

In a wireless communication system having a plurality of base station devices, if communication areas (cells) formed by the plurality of base station devices overlap each other, a signal transmitted from a certain base station device may reach a terminal device existing in a cell of another base station device located near the certain base station device, and the signal may become an interference signal for the terminal device.

It is well known that such interference can be suppressed by beam forming. That is, a base station device performs beam forming such that a beam is directed to a terminal device existing in its own cell (hereinafter, referred to as "own terminal device") while a null beam is directed to a terminal device existing in a cell of another base station device (hereinafter, referred to as "another terminal device"). Thereby, a signal (interference signal) transmitted from the base station device becomes less likely to arrive at the another terminal device, and thus interference is suppressed (refer to Non-Patent Literature 1 for beam forming).

CITATION LIST

Non Patent Literature

Non-Patent Literature 1: "Adaptive Signal Processing Using Array Antennae", written by Nobuyoshi KIKUMA, published by Kagaku Gijutsu Shuppan, Nov. 25, 1998

SUMMARY OF THE INVENTION

Problems to be Solved by the Invention

By the way, the above-mentioned wireless communication system includes, as base station devices, a macro base station device that forms a cell (macro cell) having a size of several kilometers, and a femto base station device that is located in the macro cell and forms a relatively small cell (femto cell) having a size of several tens of meters.

In the wireless communication system, the femto cell of the femto base station device is sometimes formed in the macro cell, and almost the entire area of the femto cell may overlap the macro cell. Further, the femto base station device is sometimes installed in an arbitrary place in the macro cell by the user. In this case, for example, a downlink signal transmitted from the macro base station device may interfere with a terminal device connected to the femto base station device, or an uplink signal transmitted from a terminal device connected to the macro base station device may interfere with the femto base station device.

Given this situation, it is considered that the macro base station device uses the above-described beam forming. However, the macro base station device does not know the direction in which a null beam should be directed, and therefore, it is difficult to successfully suppress interference.

As described above, since overlapping of the cells of the plurality of base station devices may cause a failure in wireless communication, such as the above-mentioned interference, any process for suppressing such failure is needed when a base station device (femto base station device) is newly installed.

An object of the present invention is to suppress interference that occurs in wireless communication when a base station device is installed.

Solution to the Problems (1) A base station device of the present invention is a femto base station device that forms a femto cell, and the femto base station device includes: a transmission unit which transmits broadcast information or paging information to another device; and an information storage unit which adds and stores base station information relating to the base station device in the broadcast information or the paging information.

According to the present invention, when the another device receives the broadcast information or the paging information transmitted from the transmission unit included in the femto base station device to the another device, the another device can acquire the base station information stored in the broadcast information or the paging information, and perform a process by using the base station information.

In particular, the femto base station device is sometimes installed in an arbitrary place in a macro cell. Therefore, for example, a downlink signal transmitted from a macro base station device may interfere with a terminal device connected to the femto base station device, or an uplink signal transmitted from a terminal device connected to the macro base station device may interfere with the femto base station device. Thus, when installing the femto base station device, the femto base station device might influence its own or neighboring wireless communication.

So, in the present invention, when installing the femto base station device, the another device is allowed to perform a process by using the base station information relating to the base station device. Therefore, for example, it is possible to suppress interference that occurs in wireless communication.

(2) Preferably, the base station information includes location information relating to the location of the base station device. In this case, the femto base station device transmits the broadcast information or the paging information in which the location information is stored. The device that has acquired the base station information can know the location of the femto base station device, and execute a process according to the location of the femto base station device by using the location information.

(3) A base station device of the present invention includes: a transmission unit which transmits broadcast information or paging information to another device; and an information storage unit which adds and stores base station information relating to the base station device in the broadcast information or the paging information. The base station information includes at least one of: scheduling algorithm information for allocation of radio resources to terminal devices communicating with the base station device; localized/distributed information relating to an allocation scheme of radio resources to the terminal devices communicating with the base station device; information indicating a transmission power by the transmission unit; and information indicating the number of antennae of the base station device.

According to the present invention, when the another device receives the broadcast information or the paging information transmitted from the transmission unit included in the base station device to the another device, the another device can acquire the base station information stored in the broadcast information or the paging information, and perform a process by using the base station information.

(4) Further, an area in which the information storage unit stores the base station information may be an area in which information relating to the name of the base station device is stored. In this case, the base station information is added and stored in the information relating to the name of the base station device.

(5) Alternatively, the area in which the information storage unit stores the base station information may be an area obtained by extending an area that is set for storing information to be given to the terminal devices.

(6) The base station device according to any of the above (1) to (5) is a transmitter-side device that transmits the broadcast information or the paging information in which the base station information is stored. On the other hand, a receiver-side base station device of the present invention includes: a reception unit which receives the broadcast information or the paging information in which the base station information is stored, the broadcast information or the paging information having been transmitted from the transmission unit in the base station device according to any of the above (1) to (5); and a signal processing unit which executes an interference suppression process by using the base station information stored in the broadcast information or the paging information received by the reception unit.

According to the receiver-side base station device of the present invention, the reception unit acquires the broadcast information or the paging information in which the base station information is stored, and thereby the signal processing unit can execute the interference suppression process by using the base station information.

(7) In the receiver-side base station device, the base station information is location information relating to the location of the transmitter-side base station device, and the signal processing unit executes, as the interference suppression process, directivity control, transmission power control, or installation-location determination control that determines whether the installation location of the base station device is appropriate.

In this case, the receiver-side base station device executes the interference suppression process by using the location information of the transmitter-side base station device.

When the receiver-side base station device executes the directivity control as the interference suppression process, the receiver-side base station device executes, for example, control to form a directivity in which a strong radio wave is not transmitted to the cell of the transmitter-side base station device.

When the receiver-side base station device executes the transmission power control as the interference suppression process, the receiver-side base station device executes, for example, control to reduce the transmission power such that a strong radio wave is not transmitted to the communication area of the transmitter-side base station device.

When the receiver-side base station device executes the installation-location determination control as the interference suppression process, if the location of the receiver-side base station device and the location of the transmitter-side base station device are too close to each other, the receiver-side base station device determines that its own location is not appropriate, and notifies the user of the result of the determination. That is, when the receiver-side base station device is too close to the transmitter-side base station device, interference is likely to occur between them. However, such interference can be avoided by executing the installation-location determination control.

(8) Preferably, the receiver-side base station device further includes a separation unit which separates the base station information from the broadcast information or the paging information in which the base station information is stored.

In this case, since the base station information is added and stored in the broadcast information or the paging information, the separation unit can separate and extract the base station information from the broadcast information or the paging information, and the extracted base station information can be used for a process.

(9) Besides the receiver-side base station devices according to the above (6) to (8), a terminal device is also an example of a wireless communication device in another cell, which receives broadcast information or paging information in which base station information is stored. The present invention relates to a terminal device which communicates with another base station device that forms a cell different from the cell of the base station device according to any of the above (1) to (5), and the terminal device includes: a reception unit which receives the broadcast information or the paging information in which the base station information is stored, the broadcast information or the paging information having been transmitted from the transmission unit in the base station device according to any of the above (1) to (5); and a signal processing unit which executes an interference suppression process by using the base station information stored in the broadcast information or the paging information received by the reception unit.

According to the terminal device of the present invention, the reception unit can acquire the broadcast information or the paging information in which the base station information is stored, and the terminal device can perform the interference suppression process by using the base station information.

(10) Further, in the terminal device, the base station information stored in the broadcast information or the paging information received by the reception unit is base station location information relating to the location of the transmitter-side base station device that transmits the broadcast information or the paging information. The terminal device further includes a terminal location information acquisition unit which acquires terminal location information relating to the location of the terminal device. The signal processing unit performs, as the interference suppression process, a process of determining the location relationship between the transmitter-side base station device and the terminal device, based on the base station location information and the terminal location information, and notifying the user of the terminal device of information indicating the result of the determination.

When the transmitter-side base station device is a base station device (referred to as "another station") that does not communicate with the terminal device, and then if the signal processing unit determines that the terminal device and the another station are too close to each other, the signal process unit notifies the user of the terminal device of information that urges the user to leave from the another station, as information indicating the result of the determination. Thereby, interference between the terminal device and the another station can be suppressed.

Further, when the transmitter-side base station device is a base station device that communicates with the terminal device, and then if the signal processing unit determines that the terminal device is too distant from the base station device, the signal processing unit notifies the user of the terminal device of information that urges the user to get closer to the base station device, as information indicating the result of the determination. Thereby, appropriate communication can be maintained.

(11) Preferably, the terminal device further includes a separation unit which separates the base station information from the broadcast information or the paging information in which the base station information is stored.

In this case, since the base station information is added and stored in the broadcast information or the paging information, the separation unit can separate and extract the base station information from the broadcast information or the paging information, and the extracted base station information can be used for a process.

(12) A wireless communication method of the present invention includes the steps of: adding and storing, by a base station device, base station information relating to the base station device in broadcast information or paging information; transmitting, by the base station device, the broadcast information or the paging information in which the base station information is stored to another device; and receiving, by a wireless communication device in another cell, the broadcast information or the paging information in which the base station information is stored, and executing an interference suppression process.

According to the present invention, when a wireless communication device in another cell receives the broadcast information or the paging information transmitted from the base station device to the another device, the wireless communication device can acquire the base station information stored in the broadcast information or the paging information, and perform the interference suppression process by using the base station information.

BRIEF DESCRIPTION OF THE DRAWINGS

FIG. 11 is a diagram illustrating an example in which a system information block is newly added, and location information is stored in the system information block.

FIG. 13 is a diagram illustrating an example of extension of paging information.

DESCRIPTION OF EMBODIMENTS

Hereinafter, preferred embodiments of the present invention will be described.

[1 Configuration of Communication System]

Figure 1:
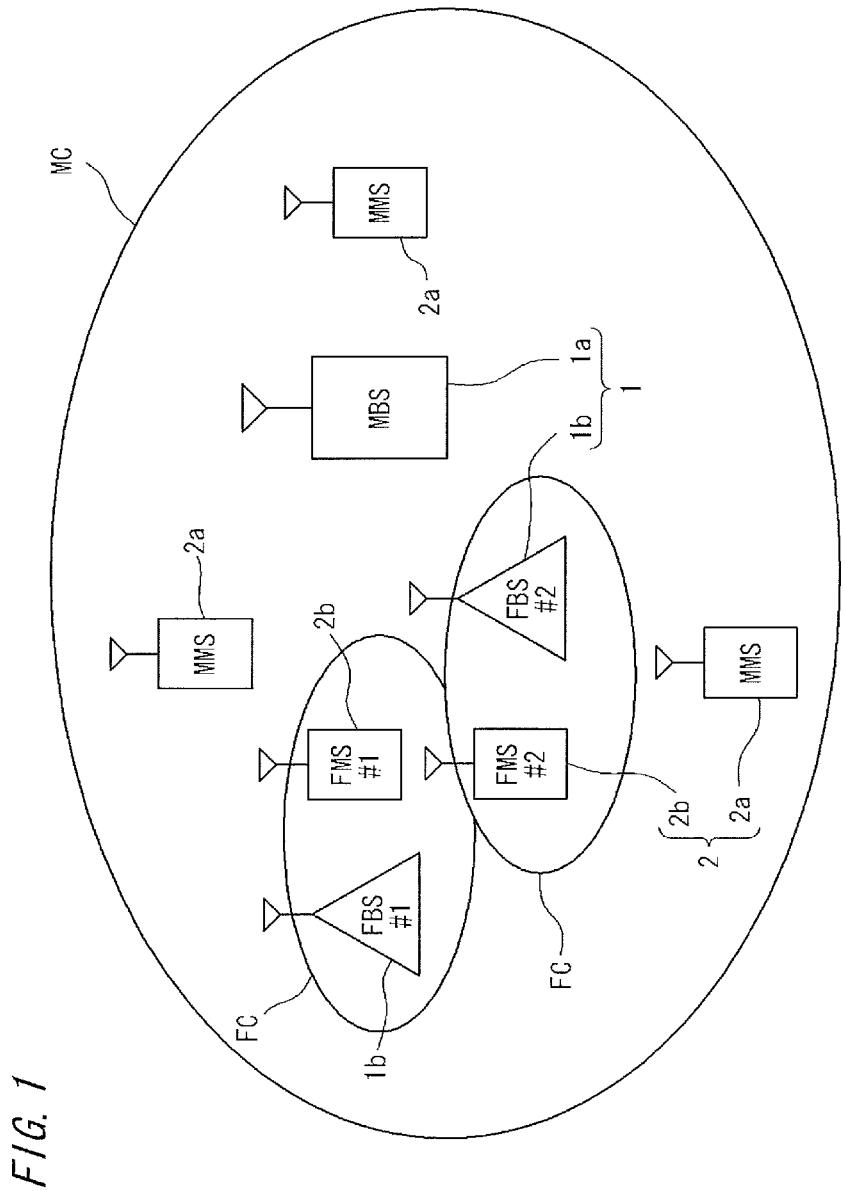
FIG. 1 is a schematic diagram illustrating a configuration of a wireless communication system including a base station device of the present invention.

FIG. 1 is a schematic diagram showing a configuration of a wireless communication system including a base station device of the present invention.

This wireless communication system includes a plurality of base station devices 1, and a plurality of terminal devices (mobile terminals) 2 that are allowed to perform wireless communication with the base station devices 1.

The plurality of base station devices 1 include: a plurality of macro base stations 1a each forming a communication area (macro cell) MC having a size of several kilometers; and a plurality of femto base stations 1b each being located in the macro cell MC, and forming a relatively small femto cell FC having a size of several tens of meters.

Each macro base station device 1a is allowed to perform wireless communication with terminal devices existing in its own macro cell MC.

On the other hand, each femto base station device 1b is installed in a place where it is difficult for the terminal devices to receive a radio signal from the macro base station device 1a, such as indoors, and forms a femto cell FC. The femto base station device 1b is allowed to wirelessly communicate with terminal devices existing in its own femto cell FC. In this system, the femto base station device 1b that forms a relatively small femto cell FC is installed in a place where it is difficult for the terminal devices to receive a radio signal from the macro base station device 1a, thereby enabling provision of services with sufficient throughput to the terminal devices.

In the following description, a terminal device 2 connected to the femto base station device 1b is sometimes referred to as a femto terminal device 2b, and a terminal device 2 connected to the macro base station device 1a is sometimes referred to as a macro terminal device 2a.

The wireless communication system of the present embodiment is, for example, a system for mobile phones to which LTE (Long Term Evolution) is applied, and communication based on the LTE is performed between each base station device and each terminal device. In the LTE, frequency division duplex (FDD) can be adopted. The present embodiment is described on assumption that the FDD is adopted. However, the communication system is not limited to that based on the LTE. Further, the scheme adopted in the LTE is not limited to the FDD. For example, TDD (Time Division Duplex) may be adopted.

[2 Frame Structure for LTE]

In the FDD that can be adopted in the LTE on which the communication system of the present embodiment is based, uplink communication and downlink communication are simultaneously performed by allocating different operating frequencies to an uplink signal (a transmission signal from a terminal device to a base station device) and a downlink signal (a transmission signal from the base station device to the terminal device).

Further, in the present embodiment, OFDM (Orthogonal Frequency Division Multiplexing) is adopted for downlink wireless communication, and SC-FDMA (Single Carrier-Frequency Division Multiple Access) is adopted for uplink wireless communication.

Figure 2:
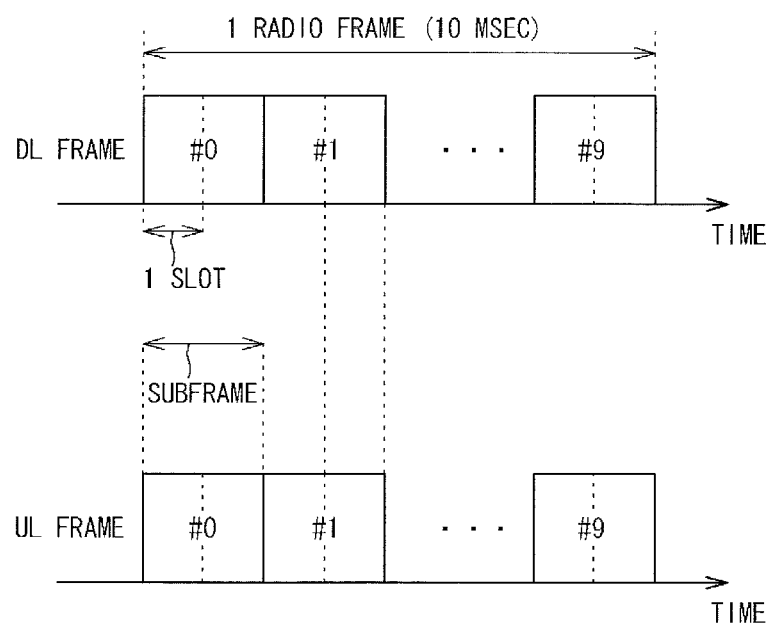
FIG. 2 is a diagram illustrating the structures of UL and DL radio frames based on LTE.

FIG. 2 is a diagram illustrating the structures of uplink and downlink radio frames for the LTE. Each of a downlink radio frame (DL frame) and an uplink radio frame (UL frame), which are the essential frames for the LTE, has a time length of 10 milliseconds per radio frame, and consists of 10 subframes #0 to #9. The DL frame and the UL frame are arranged in the time-axis direction with their timings coinciding with each other.

The timings of the DL frame and the UL frame coincide with each other between the base station devices, and thereby communication in each cell is performed in the state where so-called inter-base-station synchronization is achieved.

Figure 3:
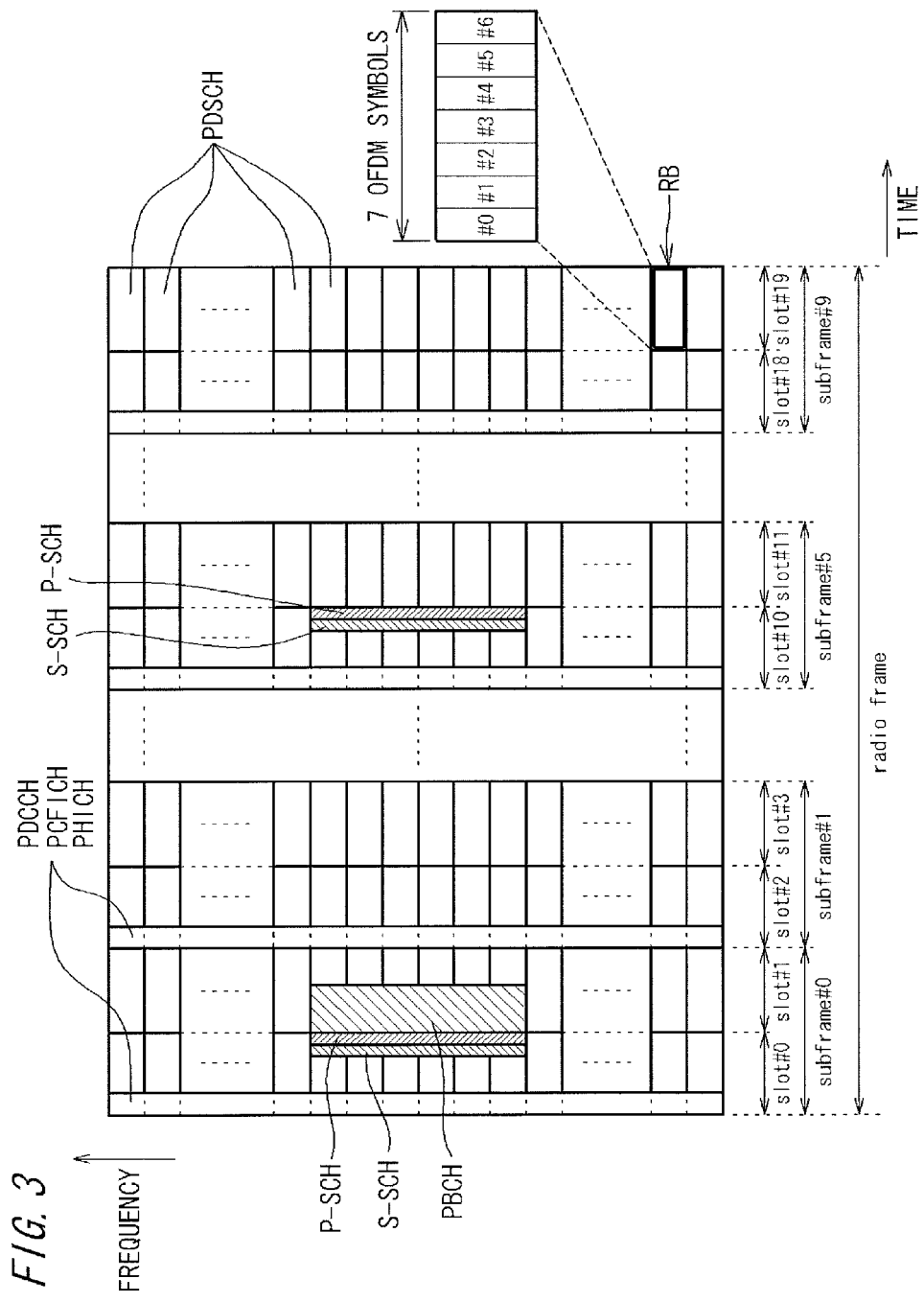
FIG. 3 is a diagram illustrating the structure of the DL frame in detail.

FIG. 3 is a diagram showing the structure of the DL frame in detail. In FIG. 3, the vertical axis direction indicates the frequency, and the horizontal axis direction indicates the time.

Each of subframes that form the DL frame consists of 2 slots (e.g., slots #0 and #1). Each slot consists of 7 (#0 to #6) OFDM symbols (in the case of Normal Cyclic Prefix).

Further, in FIG. 3, a resource block which is a minimum unit of radio resource allocation for data transmission is defined by 12 subcarriers in the frequency-axis direction and 7 OFDM symbols (1 slot) in the time-axis direction. Accordingly, when the frequency band width of the DL frame is set at, for example, 5 MHz, 300 subcarriers are arranged, and 25 resource blocks are arranged in the frequency-axis direction.

As shown in FIG. 3, at the beginning of each subframe, a transmission area for allocating a control channel required for downlink communication to a terminal device by a base station device is secured. This transmission area corresponds to symbols #0 to #2 (three symbols at maximum) in the front-side slot in each subframe. Allocated to the transmission area are: a physical downlink control channel (PDCCH) including such as allocation information of a physical downlink shared channel (PDSCH) and a physical uplink shared channel (PUSCH) in which user data and the like are stored; a physical control format indicator channel (PCFICH) for notifying information relating to the PDCCH; and a physical hybrid-ARQ indicator channel for transmitting an acknowledgement (ACK) and a negative acknowledgement (NACK) in response to a hybrid automatic repeat request (HARQ) to the PUSCH.

The PDCCH includes, in addition to the allocation information, uplink transmission power control information, and information relating to an instruction for report of a downlink CQI (Channel Quality Indicator).

Further, in the DL frame, a physical broadcast channel (PBCH) for notifying, by broadcasting, terminal devices of the frequency band width or the like of the system is allocated to the first subframe #0. The PBCH is arranged, in the time-axis direction, in the position corresponding to symbols #0 to #3 in the rear-side slot in the first subframe #0 so as to have a width corresponding to 4 symbols, and arranged, in the frequency-axis direction, in the center of the band width of the DL frame so as to have a width corresponding to 6 resource blocks (72 subcarriers). The PBCH is configured to be updated every 40 milliseconds by transmitting the same information over four frames.

Major system information such as the communication bandwidth, the structure of control information, and the like are stored in the PBCH.

Further, a master information block (MIB) is stored in the PBCH. The master information block includes: information relating to an allocation position of a system information block 1 (SIB1) which is stored in the PDSCH and transmitted to terminal devices connected to the base station device; and a radio frame number required for demodulation of the corresponding PDSCH.

Further, among the 10 subframes that form the DL frame, the 1st (#0) and 6th (#5) subframes are each allocated a primary synchronization channel (P-SCH) and a secondary synchronization channel (S-SCH) which are signals for identifying a base station device or a cell.

The P-SCH is arranged, in the time-axis direction, in the position corresponding to symbol #6 that is the last OFDM symbol in the front-side slot in each of subframes #0 and #5 so as to have a width corresponding to one symbol, and arranged, in the frequency-axis direction, in the center of the band width of the DL frame so as to have a width corresponding to 6 resource blocks (72 subcarriers). The P-SCH is information by which a terminal device identifies each of a plurality of (three) sectors into which a cell of a base station device is divided, and 3 patterns are defined.

The S-SCH is arranged, in the time-axis direction, in the position corresponding to symbol #5 that is the second last OFDM symbol in the front-side slot in each of subframes #0 and #5 so as to have a width corresponding to one symbol, and arranged, in the frequency-axis direction, in the center of the band width of the DL frame so as to have a width corresponding to 6 resource blocks (72 subcarriers). The S-SCH is information by which a terminal device identifies each of the communication areas (cells) of a plurality of base station devices, and 168 patterns are defined.

By combining the P-SCH and the S-SCH, 504 (168×3) types of patterns are defined. When a terminal device obtains a P-SCH and a S-SCH transmitted from a base station device, the terminal device can recognize in which sector of which base station device the terminal device exists.

A plurality of patterns that the P-SCH and the S-SCH can take are defined in advance in the communication standards, and are known by each base station device and each terminal device. That is, each of the P-SCH and S-SCH is a known signal that can take a plurality of patterns.

The resource blocks in an area to which the above-mentioned channels are not allocated are used for the above-mentioned physical downlink shared channel (PDSCH) in which user data and the like are stored. The PDSCH is an area shared by a plurality of terminal devices. In addition to the user data, base station information, control information for each terminal device, and the like, which will be described later, are also stored in the PDSCH.

The above-mentioned SIB1 is an example of the control information stored in the PDSCH. That is, the PDSCH includes a channel allocated for the SIB1. The SIB1 includes information relating to allocation positions of system information blocks (e.g., SIB2 to SIB12). Examples of the system information blocks include: SIB2 that is a flag indicating whether a currently connecting base station device is a macro base station or a femto base station; and SIB9 in which information relating to the name of the base station device is stored.

Allocation of the user data stored in the PDSCH is notified to terminal devices by downlink allocation information relating to downlink radio resource allocation, which is stored in the PDCCH allocated to the beginning of each subframe. The downlink allocation information is information indicating radio resource allocation for each PDSCH, and allows each terminal device to determine whether data directed to the terminal device is stored in the subframe.

[3. Configuration of Base Station Device (Femto Base Station Device)]

Figure 4:
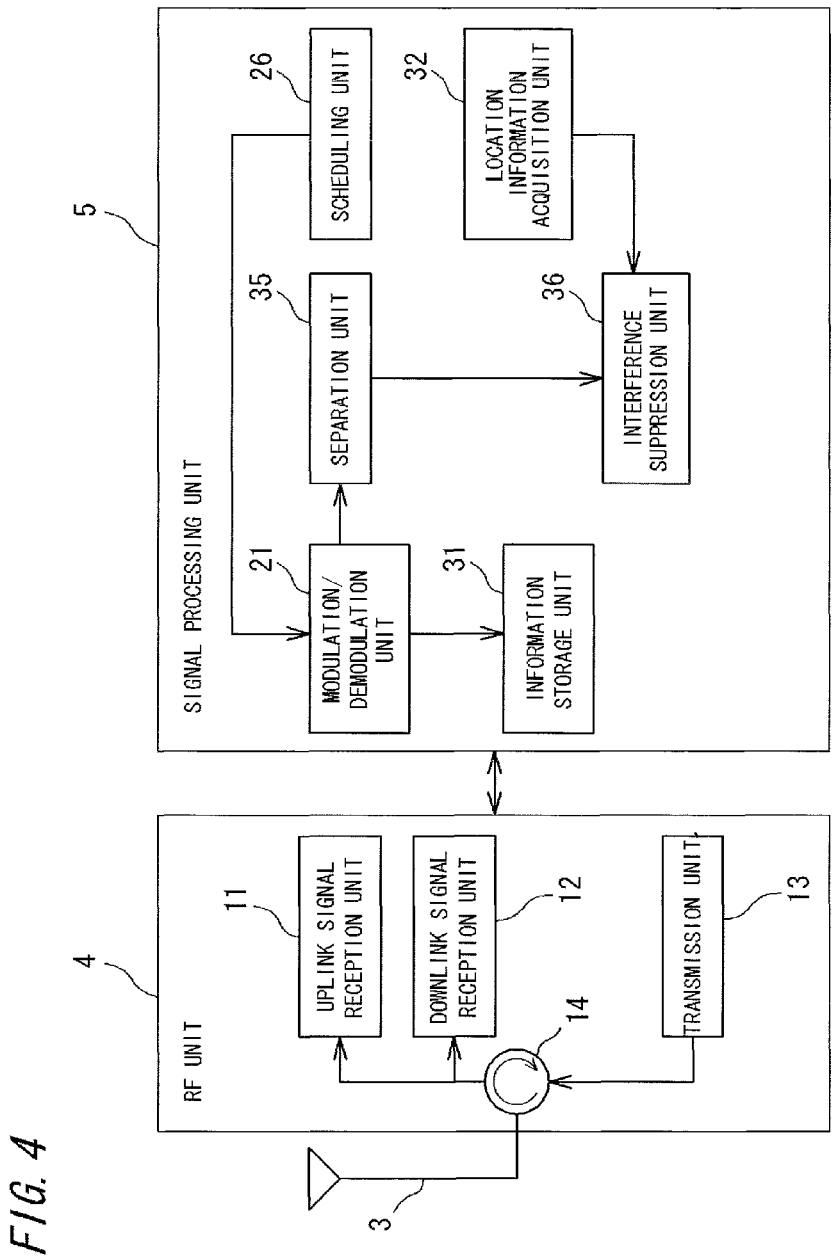
FIG. 4 is a block diagram illustrating the configuration of a femto base station device (transmitter-side base station device).

FIG. 4 is a block diagram illustrating the configuration of the femto base station device 1b shown in FIG. 1. Although the configuration of the femto base station device 1b will be described hereinafter, the configuration of the macro base station device 1a is identical to that of the femto base station device 1b.

The femto base station device 1b includes an antenna 3, a transmission/reception unit (RF unit) 4 to which the antenna 3 is connected, and a signal processing unit 5 that performs signal processing on transmission and reception signals exchanged with the RF unit 4. The signal processing unit 5, as described later, includes an information storage unit 31 which adds and stores base station information relating to the femto base station device 1b in the broadcast information included in the downlink signal. Further, the information storage unit 31, as described later, may add and store the base station information relating to the femto base station device 1b in a signal (downlink signal) including paging information.

[3.1 RF Unit]

The RF unit 4 includes an uplink signal reception unit 11, a downlink signal reception unit 12, and a transmission unit 13. The uplink signal reception unit 11 receives an uplink signal from a terminal device 2, and the downlink signal reception unit 12 receives (sniffs) a downlink signal from the macro base station device 1a or another femto base station device 1b. The transmission unit 13 transmits a downlink signal to the femto cell FC of the femto base station device 1b.

The RF unit 4 further includes a circulator 14. The circulator 14 provides a reception signal from the antenna 3 to the uplink signal reception unit 11 and to the downlink signal reception unit 12, and provides a transmission signal outputted from the transmission unit 13 to the antenna 3.

The uplink signal reception unit 11 includes a filter that allows only the frequency band of the uplink signal from the terminal device 2 to pass therethrough, an amplifier, an A/D converter, and the like. The uplink signal reception unit 11 obtains the uplink signal of the terminal device 2 from the reception signal received by the antenna 3, amplifies the uplink signal, converts the amplified signal into a digital signal, and outputs the digital signal to the signal processing unit 5. Thus, the uplink signal reception unit 11 is a reception unit which is configured to comply with reception of the uplink signal from the terminal device 2, and is essentially required by the base station device.

The transmission unit 13 includes a D/A converter, a filter, an amplifier, and the like. The transmission unit 13 receives the transmission signal outputted as a digital signal from the signal processing unit 5, converts the digital signal into an analog signal, amplifies the analog signal, and outputs the amplified signal as a downlink signal from the antenna 3.

The femto base station device 1b of the present embodiment further includes the downlink signal reception unit 12. The downlink signal reception unit 12 receives (sniffs) a downlink signal transmitted from a base station device 1 other than the femto base station device 1b.

The downlink signal reception unit 12 includes a filter that allows only the frequency band of the downlink signal from the another base station device 1 to pass therethrough, an amplifier, an A/D converter, and the like. The downlink signal reception unit 12 obtains the downlink reception signal of the another base station device 1 from the reception signal received by the antenna 3, amplifies the reception signal, converts the amplified signal into a digital signal, and outputs the digital signal.

The downlink reception signal outputted from the downlink signal reception unit 12 is provided to the signal processing unit 5, and processed by a modulation/demodulation unit 21 and the like.

[3.2 Signal Processing Unit]

The signal processing unit 5 includes a modulation/demodulation unit 21 which performs signal processing on transmission and reception signals exchanged between an upper layer above the signal processing unit 5, and the RF unit 4. The modulation/demodulation unit 21 demodulates the uplink signal provided from the uplink signal reception unit 11 to uplink reception information, outputs the uplink reception information to the upper layer, and modulates various kinds of transmission information (broadcast information, paging information, and the like) provided from the upper layer.

Then, the transmission unit 13 in the RF unit 2 transmits, to the terminal device 2b communicating with the femto base station device 1b, the transmission information (broadcast information and paging information) useful for the terminal device 2b, as a downlink signal.

Based on an instruction from a scheduling unit 26, the modulation/demodulation unit 21 modulates the broadcast information provided from the upper layer, for each predetermined data unit, by a predetermined modulation scheme, and performs allocation of the modulated data to the DL frame in units of resource blocks, thereby generating a downlink signal of the femto base station device 1b.

The modulation/demodulation unit 21 is also able to demodulate a downlink signal from another cell, which is received by the downlink signal reception unit 12, and an uplink signal from another cell, which is received by the uplink signal reception unit 11.

The signal processing unit 5 includes the information storage unit 31 which adds and stores the base station information relating to the femto base station device 1b in the broadcast information and/or the paging information. The base station information is information to be used for an interference suppression process by a wireless communication device in another cell. In the present embodiment, the base station information is location information relating to the location of the femto base station device 1b. Therefore, the information storage unit 31 has a function of storing the location information of the femto base station device 1b in the broadcast information and/or the paging information. Further, the wireless communication device in the another cell is a device that receives the broadcast information. Examples of the wireless communication device include: <1> a macro base station device 1a that forms a cell different from the femto cell FC formed by the transmitter-side femto base station device 1b; and <2> a femto base station device 1b that is located near the transmitter-side femto base station device 1b but is different from the transmitter-side femto base station device 1b.

The signal processing unit 5 further includes a location information acquisition unit 32 which acquires location information. In the present embodiment, the location information acquisition unit 32 is a GPS receiver mounted on the femto base station device 1b. The location of the femto base station device 1b is determined based on a GPS signal received by the GPS receiver.

[3.2.1 Storage of Location Information]

Figure 5:
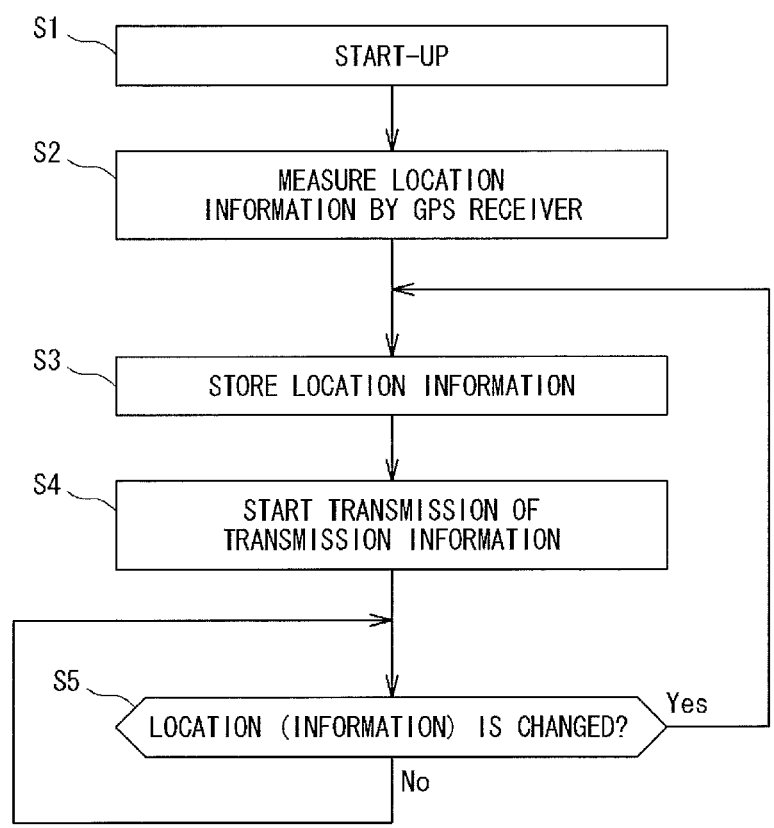
FIG. 5 is a flowchart illustrating a transmission process performed by the transmitter-side base station device.

FIG. 5 is a flowchart illustrating a transmission signal (broadcast information) transmission process performed by the femto base station device 1b. The process in the case where the base station information is stored in the paging information will be described later.

When the femto base station device 1b is started up (step S1), the location information acquisition unit (GPS receiver) 32 measures the location of the femto base station device 1b (step S2). Then, the information storage unit 31 performs a process of storing location information relating to this location in the broadcast information (step S3). The modulation/demodulation unit 21 modulates the broadcast information, and the transmission unit 13 in the RP unit 2 transmits the broadcast information as a downlink signal (step S4).

Then, a wireless communication device (e.g., the macro base station device 1a) in a cell other than the cell (femto cell FC) of the femto base station device 1b is allowed to receive the broadcast information in which the location information is stored, and execute an interference suppression process.

Even after step S4, the location information acquisition unit 32 measures the location of the femto base station device 1b at predetermined intervals, and determines a change in the location (location information) (step S5). If the location greatly changes beyond a threshold (Yes in step S5), the information storage unit 31 performs a process of restoring the changed location information in the broadcast information (step S3). If the location (location information) does not change (No in step S5), determination of a location change is repeatedly executed (step S5).

The location information of the femto base station device 1b acquired by the GPS receiver is stored in any resource block together with part of the broadcast information to be transmitted by the femto base station device 1b.

The storage area in which the location information is stored may be, for example, the SIB9 in which information relating to the name of the base station device (femto base station device 1b) is stored, as described in the above [2. Frame structure for LTE].

In the LTE, the SIB9 (48 bytes) is secured as an area for broadcasting the name of the base station device. Since the user is allowed to freely set the name of the base station device and store the name in the SIB9, "information of the name of the base station device+location information of the base station device" is stored in the SIB9. The location information is latitude and longitude.

Specifically, it is assumed that the GPS receiver receives, as the location information of the femto base station device 1b, "longitude=135 deg, 41 min, 35.600 sec" and "latitude=+35 deg, 00 min, 35.600 sec". In this case, the information storage unit 31 converts the location information into a predetermined form as follows, according to a predetermined conversion algorithm.

Regarding the longitude, the location information is converted into a numerical value expressed in milliseconds. That is, the following calculation is executed.

$$(\text{longitude}) = +135\ deg, 41\ min, 35.600\ sec$$
$$= 600\ (msec) + 1000 \times 35\ (sec) + 1000 \times 60 \times$$
$$41\ (min) + 1000 \times 60 \times 60 \times 135$$
$$= 488495600\ (msec)$$

Further, the information storage unit 31 converts this value (488495600) into UTF-8 as follows.

488495600=0x1d1dd9f0

Further, the information storage unit 31 encodes the value in 6 bits of [0-9, A-Z, a-z, +2 symbols] as follows.

0x1d1dd9f0=0T7Tdm

Regarding the latitude, the information storage unit 31 converts the location information by using the same conversion algorithm as above.

$$(\text{latitude}) = +35\ deg, 00\ min, 35.600\ sec = 126035600\ (msec)$$
$$126035600 = 0x1d1dd9f0$$
$$0x1d1dd9f0 = 07WoQG$$

Assuming that the name of the femto base station device 1b is "MyFemto", "MyFemto" should be originally stored in the SIB9. However, the information storage unit 31 additionally stores the encoded location information to rewrite the "MyFemto" to "MyFemto_07WoQG_0T7Tdm".

Information about a geodetic system (geo) and an accuracy (x-acc) adopted by the GPS receiver may be additionally stored. In this case, "(name)_(latitude)_(longitude)_(geo)_(x-acc)" is stored in the SIB9. The geodetic system (geo) is WGS84 (WGS: World Geodetic System). The accuracy (x-acc) is "3" when the error range is "horizontal error<50 m", "2" when the error range is "50 m<horizontal error<300 m", and "1" when the error range is "300 m<horizontal error".

In the above description, the "information of the name of the base station device" stored in the SIB9 is used as the storage area for the location information, and the "location information of the base station device" is added after the "information of the name of the base station device". In other words, the information storage unit 31 additionally stores the encoded location information to rewrite the "MyFemto" to "MyFemto_07WoQG_0T7Tdm". That is, in this case, the method of use of the already-defined information element is changed.

Figure 10:
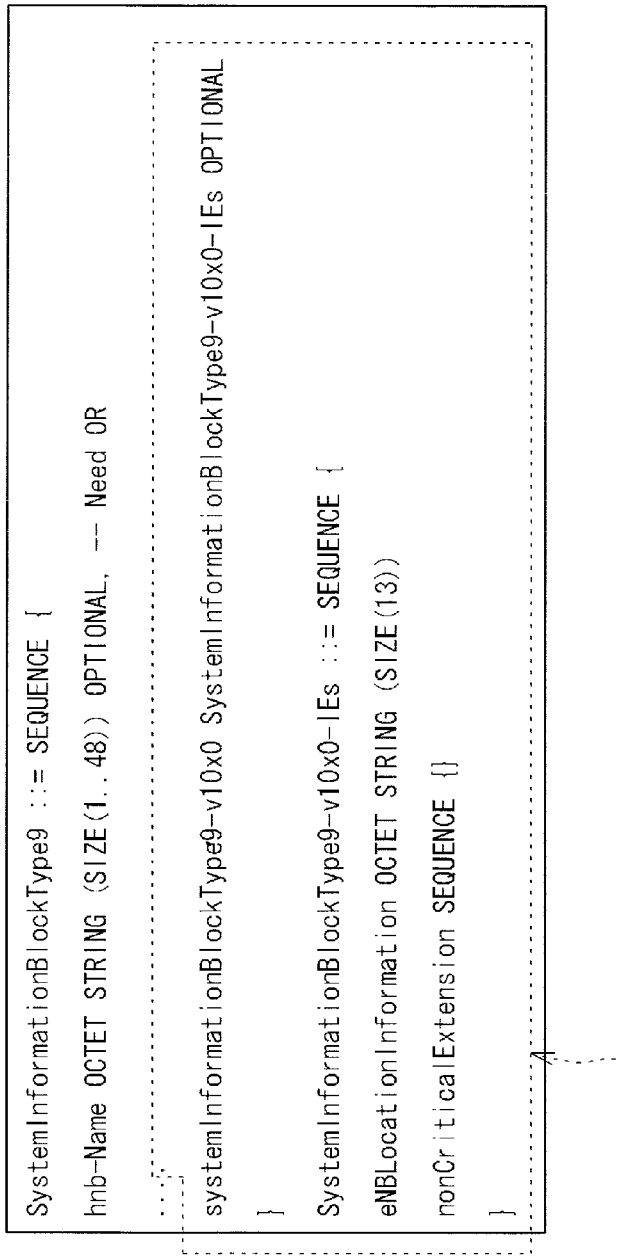
FIG. 10 is a diagram illustrating an example in which location information is added to broadcast information.

However, the method of adding the base station information (location information) is not limited to the above method. For example, an information element may be newly created without changing the already-defined information element. In this case, the base station information (location information) is the newly-created information. In the case where the location information is longitude and latitude as described above, the information storage unit 31 additionally stores the encoded location information "07WoQG_0T7Tdm", as shown in FIG. 10.

Further, the area in which the information storage unit 31 stores the location information of the femto base station device 1b is not limited to the SIB9. The information storage unit 31 is allowed to freely store the location information in a storage area that is secured for storage of the location information. In the case where SIB2 to SIB11 are usually secured as a storage area for the information to be given to the terminal device 2 connected to the femto base station device 1b, the area may be extended up to SIB12, and the location information may be stored in the SIB12. FIG. 11 shows the case where a system information block (a type of system information block) is newly added (SIB14), and the location information is stored in the system information block.

[3.2.2 Storage of Location Information]

Figure 12:
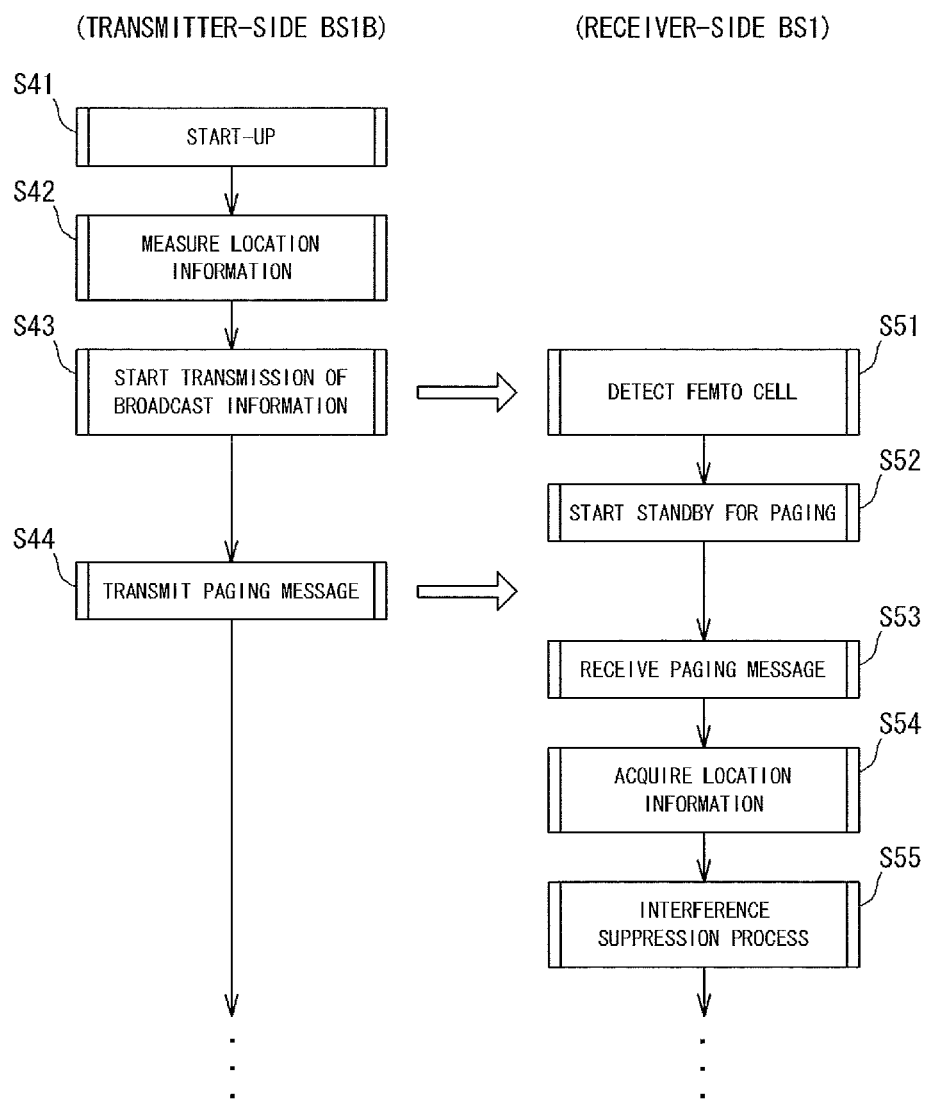
FIG. 12 is a diagram illustrating process steps performed by a femto base station device that stores base station information in paging information and transmits the paging information, and a receiver-side base station device that is different from and located near the femto base station device.

The following will describe a process in the case where base station information is stored in paging information. FIG. 12 is a diagram illustrating process steps to be performed by a femto base station device 1b (referred to as "transmitter-side BS1b") which transmits paging information in which base station information is stored, and a receiver-side base station device (referred to as "receiver-side BS1") which is different from and located near the femto base station device 1b.

When the transmitter-side BS1b is started up (step S41), the location information acquisition unit (GPS receiver) 32 measures the location of the transmitter-side BS1b (step S42). Then, the modulation/demodulation unit 21 modulates broadcast information, and the transmission unit 13 in the RF unit 2 transmits the broadcast information as a downlink signal (step S43).

The receiver-side BS1 is able to receive the broadcast information, and detect the transmitter-side BS1*b* (step 51). Then, the receiver-side BS1 starts standby for paging information (step S52).

In the transmitter-side BS1*b*, after step S43, the information storage unit 31 performs a process of storing, in the paging information, the location information relating to the location measured in step S42, the modulation/demodulation unit 21 modulates the paging information, and the transmission unit 13 in the RF unit 2 transmits the paging information as a downlink signal (step S44).

The location information is stored in an area that is obtained by extending the area secured for storage of the paging information. FIG. 13 is a diagram illustrating an example of extension of the paging information, and the location information is stored in the extended information element. For example, like the above-described case, the encoded location information "07WoQG_0T7Tdm" is stored.

When the transmitter-side BS1*b* transmits the paging information in which the location information is stored (step S44), the receiver-side BS1 receives the paging information (step S53), acquires the location information stored in the paging information (step S54), and executes an interference suppression process (step S55).

Further, in the transmitter-side BS1*b*, even after step S44, the location information acquisition unit 32 may measure the location of the transmitter-side BS1*b* at predetermined intervals, and repeat determination of a location change.

In the above [3.2.1 Storage of location information] and [3.2.2 Storage of location information], storage of the location information in the broadcast information and storage of the location information in the paging information are described, respectively. However, the location information may be stored in both the broadcast information and the paging information, and the broadcast information and the paging information may be transmitted. In the present embodiment, as shown in FIG. 12, the receiver-side BS1 needs to perform standby using the paging channel, in order to receive the paging information. Therefore, the timing at which the receiver-side BS1 can start standby is after reception of the broadcast information. Accordingly, even when the location information is stored in both the broadcast information and the paging information, the location information stored in the broadcast information is highly likely to be used for the interference suppression process.

In the above description, the femto base station device 1*b* is described as the transmitter-side base station device which transmits the broadcast information and/or the paging information in which the location information is stored. Examples of base station devices in other cells, which can receive the broadcast information and/or the paging information include: <1> a macro base station device 1*a*; and <2> a femto base station device 1*b* which is different from and located near the transmitter-side base station device 1*b*. The transmitter-side base station device is referred to as a transmitter-side BS1*b*, and the receiver-side base station device in the another cell is referred to as a receiver-side BS1.

[4. Configuration of Receiver-Side Base Station Device (Receiver-Side BS1)]

Figure 6:
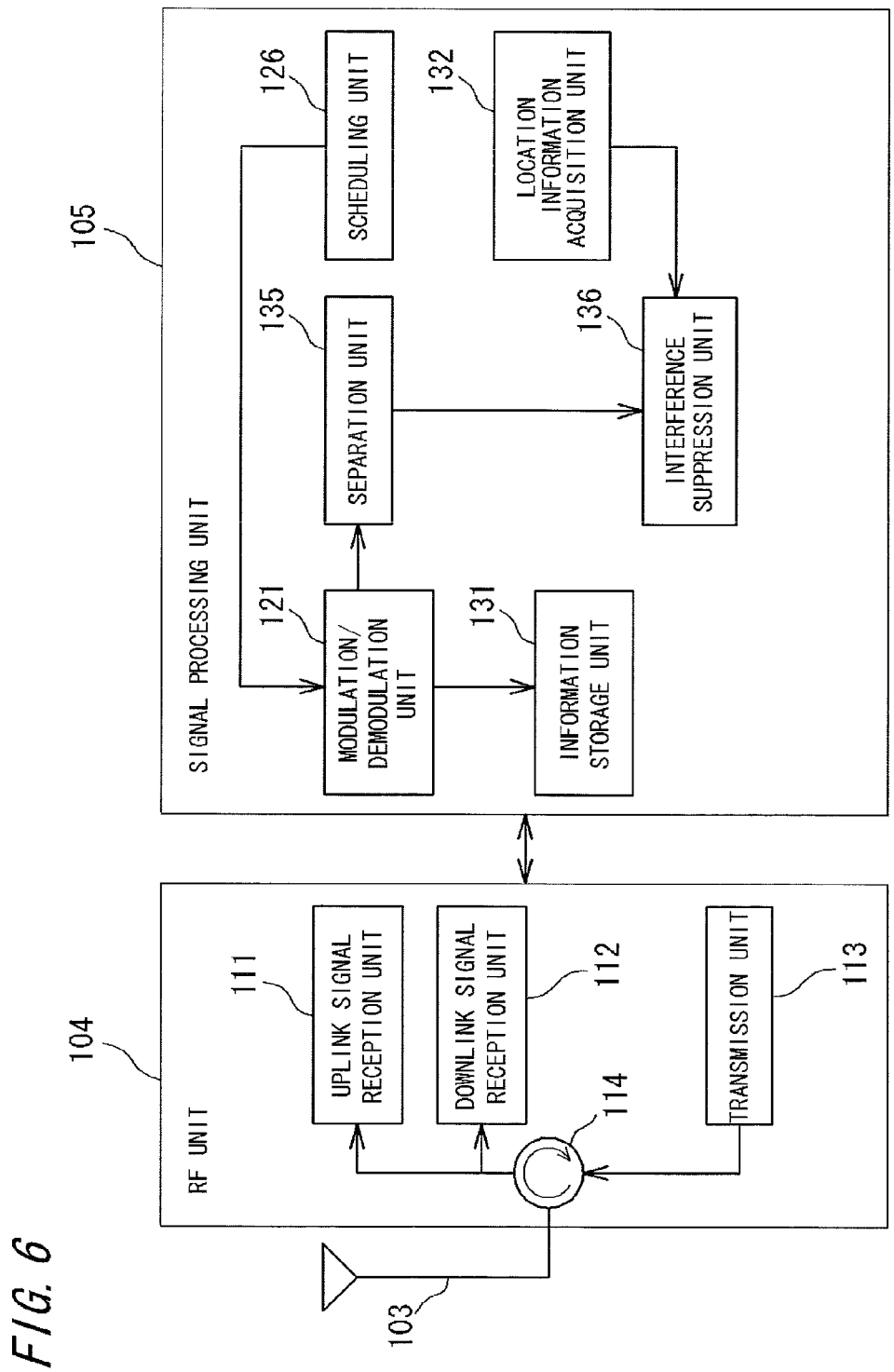
FIG. 6 is a block diagram illustrating the configuration of a receiver-side base station device.

FIG. 6 is a block diagram illustrating the configuration of the receiver-side BS1.

The receiver-side BS1 includes an antenna 103, a transmission/reception unit (RF unit) 104 to which the antenna 103 is connected, and a signal processing unit 105 that performs signal processing on transmission and reception signals exchanged with the RF unit 104.

The antenna 103 and the transmission/reception unit (RF unit) 104 are identical to those of the femto base station device 1*b*. In particular, a downlink signal reception unit 112 in the RF unit 104 receives a downlink signal transmitted from the femto base station device 1*b* which transmits the broadcast information in which the location information is stored.

The signal processing unit 105 is also identical to that of the transmitter-side BS1*b*. However, the signal processing unit 105 has a function of executing, as a process for appropriately performing communication, a process of suppressing interference by using the location information stored in the broadcast information received by the RF unit 104.

The interference suppression process executed by the signal processing unit 105 is a process of suppressing interference in the femto cell FC of the transmitter-side BS1*b*, or interference in the cell of the receiver-side BS1. Hereinafter, a description will be mainly given of the case where a process of suppressing interference in either or both of the transmitter-side BS1*b* and a terminal device 2*b* communicating with the transmitter-side BS1*b* is executed.

The signal processing unit 105 executes, as the interference suppression process, directivity control, transmission power control, or installation-location determination control for determining whether the installation location of the receiver-side BS1 is appropriate. These controls will be described later in detail.

In order to execute the interference suppression process by using the location information, the signal processing unit 105 further includes a separation unit 135 which separates the location information of the transmitter-side BS1*b* from the broadcast information in which the location information is stored.

The transmitter-side BS1*b* transmits the broadcast information, and the downlink signal reception unit 112 in the RF unit 104 of the receiver-side BS1 sniffs this broadcast information. The modulation/demodulation unit 121 in the receiver-side BS1 demodulates the downlink signal to obtain the information of the SIB9 in which the location information is stored.

That is, the master information block stored in the PBCH (FIG. 3) in the received downlink signal includes information relating to the allocation position of the SIB1, and the SIB1 includes information relating to the resource block allocation positions of SIB2 to SIB12. Therefore, the separation unit 35 can separate and extract only the location information from the "information of name+location information" of the femto base station device 1*b*, which is stored in the SIB9.

In other words, the separation unit 35 can extract "07WoQG_0T7Tdm" from "MyFemto_07WoQG_0T7Tdm" stored in the SIB9.

Then, the separation unit 135 restores the location information of the transmitter-side BS1*b* to the information of longitude and latitude, by using a conversion algorithm that is a reverse procedure to the above-described conversion algorithm adopted by the information storage unit 31 (FIG. 4). In other words, the location information is restored to "longitude=+135 deg, 41 min, 35.600 sec" and "latitude=+35 deg, 00 min, 35.600 sec" by the separation unit 135.

In this way, the receiver-side BS1 can separate and extract the location information of the femto base station device 1*b* from the sniffed downlink signal, and the signal processing unit 105 can use the location information for the interference suppression process.

While the case where the location information is stored in the broadcast information has been described, the configuration of the receiver-side base station device (receiver-side BS1) is identical to that shown in FIG. 6 also in the case where the location information is stored in the paging information.

That is, the downlink signal reception unit 112 in the RF unit 104 receives a downlink signal transmitted from the femto base station device 1b which transmits the paging information in which the location information is stored.

The signal processing unit 105 has a function of executing, as a process of appropriately perform communication, a process of suppressing interference by using the location information stored in the paging information received by the RF unit 104. Further, in order to execute the interference suppression process by using the location information, the signal processing unit 105 further includes the separation unit 135 which separates the location information of the transmitter-side BS1b from the paging information in which the location information is stored.

The transmitter-side BS1b transmits the paging information, and the downlink signal reception unit 112 in the RF unit 104 of the receiver-side BS1 sniffs the paging information. The modulation/demodulation unit 121 in the receiver-side BS1 demodulates the downlink signal to obtain the paging information in which the location information is stored. The separation unit 35 can separate and extract only the location information from the paging information.

Then, the separation unit 135 restores the location information of the transmitter-side BS1b to the information of longitude and latitude, by using a conversion algorithm that is a reverse procedure to the above-described conversion algorithm adopted by the information storage unit 31 (FIG. 4).

[4.1 Directivity Control]

The following will describe the case where directivity control is performed as the interference suppression process.

The signal processing unit 105 of the receiver-side BS1 includes a location information acquisition unit 132 which acquires location information relating to the location of the receiver-side BS1. The location information acquisition unit 132 is a GPS receiver, and the location of the receiver-side BS1 is calculated based on a GPS signal received by the GPS receiver.

Further, the antenna 103 of the receiver-side BS1 is configured as an adaptive array antenna in which a plurality of antennae are arrayed. The signal processing unit 105 includes an interference suppression unit 136 having a directivity control function. The interference suppression unit 136 adaptively controls the weights on the respective antennae to electrically change the directivity of the antenna 103.

Since the signal processing unit 105 acquires, in addition to the location information of the receiver-side BS1, the location information of the transmitter-side BS1b separated by the separation unit 135, the interference suppression unit 136 performs beam forming so as to direct a null beam to the femto base station device 1b, i.e., to the femto cell FC.

Thereby, a signal (interference signal) from the receiver-side BS1 is less likely to reach the terminal device 2b existing in the femto cell FC of the transmitter-side BS1b while a beam is directed to the terminal device 2a in the communication area of the receiver-side BS1, thereby suppressing interference in the terminal device 2b.

Likewise, the interference suppression unit 136 can make it difficult for the receiver-side BS1 to receive a signal from the terminal device 2b connected to the transmitter-side BS1b. That is, the process of suppressing interference in either or both of the receiver-side BS1 and the terminal device communicating with the receiver-side BS1 is executed.

[4.3 Transmission Power Control]

The following will describe the case where transmission power control is performed as the interference suppression process.

Also in this case, the signal processing unit 105 in the receiver-side BS1 includes the location information acquisition unit (GPS receiver) 132 which acquires the location information relating to the location of the receiver-side BS1. Further, the signal processing unit 105 acquires the location information of the transmitter-side BS1b by the separation unit 135.

If the receiver-side BS1 is far from the femto base station device 1b, the receiver-side BS1 (the femto base station device 1b) is less likely to interfere with the femto base station device 1b (the receiver-side BS1). However, if the receiver-side BS1 is close to the femto base station device 1b, the receiver-side BS1 (the femto base station device 1b) is more likely to interfere with the femto base station device 1b (the receiver-side BS1).

So, the signal processing unit 105 includes the interference suppression unit 136 having a power control function. The interference suppression unit 136 has a function of determining the location relationship (distance) between the receiver-side BS1 and the transmitter-side BS1b, and a power control function of setting the transmission power of a downlink signal to be transmitted.

As described above, the interference suppression unit 136 determines the distance between the receiver-side BS1 and the femto base station device 1b, and compares the distance with a threshold. When the distance is smaller than the threshold, the interference suppression unit 136 performs control so as to suppress (the upper limit value of) the transmission power of the downlink signal. This control avoids the situation that the downlink signal from the receiver-side BS1 becomes an interference signal in the terminal device 2b connected to the femto base station device 1b.

Further, the interference suppression unit 136 has a function of generating uplink transmission power control information, when the signal processing unit 105 generates a downlink signal. The uplink transmission power control information is an instruction signal that causes the terminal device connected to the receiver-side BS1 to adjusts the transmission power of an uplink signal transmitted from the terminal device. By storing this information in the downlink signal (PDCCH) and transmitting the downlink signal to the terminal 2a connected to the receiver-side BS1, the terminal device 2 is allowed to adjust (suppress the upper limit value of) the transmission power.

That is, based on the location of the receiver-side BS1 and the location of the transmitter-side BS1b, the interference suppression unit 136 obtains the distance between them, and compares the distance with the threshold. Then, if the distance is smaller than the threshold, the interference suppression unit 136 generates the uplink transmission power control information for suppressing (the upper limit value of) the transmission power of the uplink signal. The uplink transmission power control information is stored in the downlink signal from the receiver-side BS1, and thereby the terminal device 2 connected to the receiver-side BS1 acquires the uplink transmission power control information.

Then, the terminal device 2 performs control to suppress the transmission power of the uplink signal to be transmitted. This control avoids the situation that the uplink signal from the terminal device 2 becomes an interference signal in the transmitter-side BS1b.

In this way, the receiver-side BS1 executes, as the interference suppression process, power control for the receiver-side BS1 and/or the terminal device connected to the receiver-side BS1, thereby avoiding the situation that a strong radio wave is transmitted to the femto cell FC of the transmitter-side BS1b. As a result, it is possible to suppress interference.

[4.3 Installation-Location Determination Control]

The following will describe the case where installation-location determination control is performed as the interference suppression process.

In the following description, the receiver-side BS1 is a second femto base station device 1b which is different from the transmitter-side BS1b (the first femto base station device). The second femto base station device 1b performs the installation-location determination control. The second femto base station device 1b has the same configuration as that shown in FIG. 4.

The second femto base station device 1b includes a location information acquisition unit (GPS receiver) 32 which acquires location information relating to the location of the second femto base station device 1b. The signal processing unit 5 in the second femto base station device 1b acquires the location information of the first femto base station device 1b which transmits broadcast information and/or paging information.

The signal processing unit 105 includes an interference suppression unit 36 having an installation-location determination control function. The interference suppression unit 36 determines whether the installation location of the second femto base station device 1b is appropriate, as the interference suppression process. That is, if the second femto base station device 1b is far from another femto base station device, the second femto base station device 1b (the another femto base station device) is less likely to interfere with the another femto base station device (the second femto base station device 1b). However, if the second femto base station device 1b is close to the another femto base station device, the second femto base station device 1b (the another femto base station device) is more likely to interfere with the another femto base station device (the second femto base station device 1b).

So, based on the location of the second femto base station device 1b and the location of the transmitter-side first femto base station device 1b, the interference suppression unit 36 obtains the distance between them, and compares the distance with a threshold. If the distance is smaller than the threshold, it means that the location of the second femto base station device 1b is too close to the location of the first femto base station device 1b. Therefore, the interference suppression unit 36 determines that the location of the second femto base station device 1b is not appropriate, and notifies the user of the result of the determination. For example, the interference suppression unit 36 causes an LED to emit light as a warning. The warning causes the user to change the installation location of the second femto base station device 1b.

After the installation location is changed, the interference suppression unit 36 again compares the distance between the second femto base station device 1b and the first femto base station device 1b with the threshold. If the distance is equal to or greater than the threshold, it means that the location of the second femto base station device 1b is far from the location of the first femto base station device 1b. Therefore, the interference suppression unit 36 determines that the location of the second femto base station device 1b is appropriate, and notifies the user of the result of the determination. Thereby, the user can determine the installation location of the second femto base station device 1b.

By executing the installation-location determination control as described above, it is possible to suppress interference that may be caused in each cell by installation of a new femto base station device 1b.

[5. Interference Suppression Process in Terminal Device]

In the above-described embodiment, the wireless communication device which executes, as a process for appropriately performing communication, the interference suppression process by using the location information transmitted from the femto base station device 1b, is a base station device (receiver-side BS1). However, a terminal device 2 may autonomously perform the interference suppression process.

Figure 7:
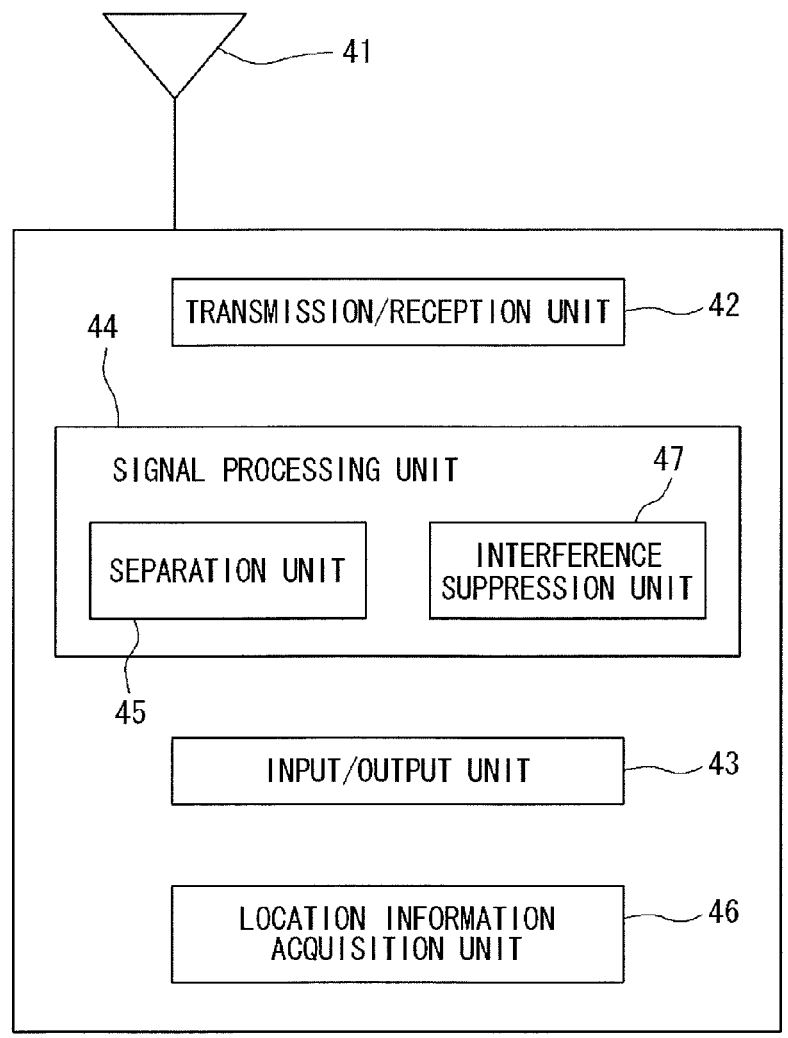
FIG. 7 is a block diagram illustrating the configuration of a terminal device.

FIG. 7 is a block diagram illustrating the configuration of a terminal device 2. A macro terminal device 2a and a femto terminal device 2b are identical in configuration, except that the macro terminal device 2a is connected to a macro base station device 1a while the femto terminal device 2b is connected to a femto base station device 1b.

The terminal device 2 includes: an antenna 41; a transmission/reception unit 42 to which the antenna 41 is connected, and which receives a downlink signal from a base station device, and transmits an uplink signal to be transmitted; an input/output unit 43 which is implemented by a keyboard, a monitor and the like, and performs input/output of transmission/reception data; and a signal processing unit 44 which controls the transmission/reception unit 42 and the input/output unit 43, and performs processes required for communication with the base station device, such as modulation and demodulation.

The transmission/reception unit 42 has a function as a reception unit that receives the broadcast information and/or the paging information in which the location information is stored, and which is transmitted from the femto base station device 1b.

The signal processing unit 44 receives the various kinds of control information included in a downlink signal transmitted from a base station device 1 to which the terminal device 2 is connected, and performs communication with the base station device 1 in accordance with the control information. Examples of the control information include: uplink allocation information indicating the frequency band allocated to the uplink signal of the terminal device 2; information relating to the transmission power; and information relating to the modulation scheme.

That is, the base station device 1 transmits the various kinds of control information to the terminal device 2 connected to the base station device 1, thereby performing control relating to the uplink signal of the terminal device 2.

Further, the signal processing unit 44 executes, as a process for appropriately perform communication, an interference suppression process by using the location information stored in the broadcast information and/or the paging information included in the downlink signal received by the transmission/reception unit 42.

The signal processing unit 44 further includes a separation unit 45 which separates the location information of the transmitter-side femto base station device 1b from the broadcast information and/or the paging information in which the location information is stored, in order to execute the interference suppression process by using the location information.

The separation unit 45 has the same configuration as the separation unit 135 of the receiver-side BS1 (FIG. 6). The separation unit 45 extracts, as the location information, "07WoQG_0T7Tdm" from "MyFemto_07WoQG_0T7Tdm" stored in the SIB9 in the downlink signal (or from the paging information), and restores the location information of the femto base station device 1b to the information of longitude and latitude.

The terminal device described here is a macro terminal device 2a connected to the macro base station device 1a. In this case, interference occurs as follows. In the above-described wireless communication system, after installation of the macro base station device 1a, the femto base station device 1b is installed in the macro cell MC formed by the macro base station device 1a, and forms a femto cell FC in the macro cell MC. Therefore, a downlink signal transmitted from the installed femto base station device 1b to a femto terminal device 2b existing in the femto cell of the femto base station device 1b might interfere with the macro terminal device 2a.

So, the signal processing unit 44 in the macro terminal device 2a includes an interference suppression unit 47 for suppressing such interference. Further, the macro terminal device 2a includes a location information acquisition unit 46 for acquiring location information relating to the location of the macro terminal device 2a. The location information acquisition unit 46 is a GPS receiver, and the location of the macro terminal device 2a is calculated based on a GPS signal received by the GPS receiver.

Then, the signal processing unit 44 acquires, by the separation unit 45, the location information of the femto base station device 1b which transmits the broadcast information and/or the paging information. Therefore, the interference suppression unit 47 can determine the location relationship (distance) between the macro terminal device 2a and the femto base station device 1b.

If the macro terminal device 2a is far from the femto base station device 1b, the possibility of interference is low. However, as the macro terminal device 2a gets closer to the femto base station device 1b, the possibility of interference increases.

So, the interference suppression unit 47 performs, as the interference suppression process, a process of determining the location relationship between the transmitter-side femto base station device 1b and the macro terminal device 2a, based on the location information of the transmitter-side femto base station device 1b and the location information of the macro terminal device 2a, and notifying the user of information indicating the result of the determination by means of the input/output unit 43 (e.g., a monitor).

For example, since the transmitter-side femto base station device 1b is a base station device (referred to as "another station") that does not communicate with the macro terminal device 2a, when the interference suppression unit 47 obtains the location relationship (distance) between the macro terminal device 2a and the another station, compares the distance with a threshold, and determines that the distance is smaller than the threshold, this determination result means that the macro terminal device 2a and the another station are too close to each other. Therefore, as information indicating the determination result, the interference suppression unit 47 notifies the user of information such as a text that urges the user to move away from the another station, by means of the input/output unit 43 (e.g., a monitor). Thereby, the user who owns the macro terminal device 2a can move away from the another station, and thus interference between the macro terminal device 2a and the another station can be suppressed.

[6. Other Pieces of Base Station Information]

In the above-described embodiments, the base station information stored in the broadcast information and/or the paging information is the location information. In the present invention, however, the base station information is not limited to the location information, but may be information that can be known by only the corresponding base station device, and does not change in real time.

For example, the base station information may include at least one of: location information; scheduling algorithm information for allocation of radio resources to terminal devices communicating with the base station device; localized/distributed information; information indicating the transmission power by the transmission unit of the base station device; and information indicating the number of antennae of the base station device.

The following will describe the case where the base station information is the scheduling algorithm information.

Examples of scheduling algorithms include: round robin (RR); proportional fairness (PF); and maximum CIR. In the RR, resources are sequentially allocated to users without considering the transmission channel condition or the like. The RR is likely to cause an increase in temporal variation in resource allocation. In the PF, scheduling is performed so that the communication rates of the users coincide with each other. The temporal variation in resource allocation is smaller in the PF than in the PR. In the maximum CIR, resources are preferentially allocated to the user having the highest CIR (Carrier to Interference Ratio). The temporal variation in resource allocation is smaller in the maximum CIR than in the RR and the PF, and almost localized allocation is achieved.

Figure 8:
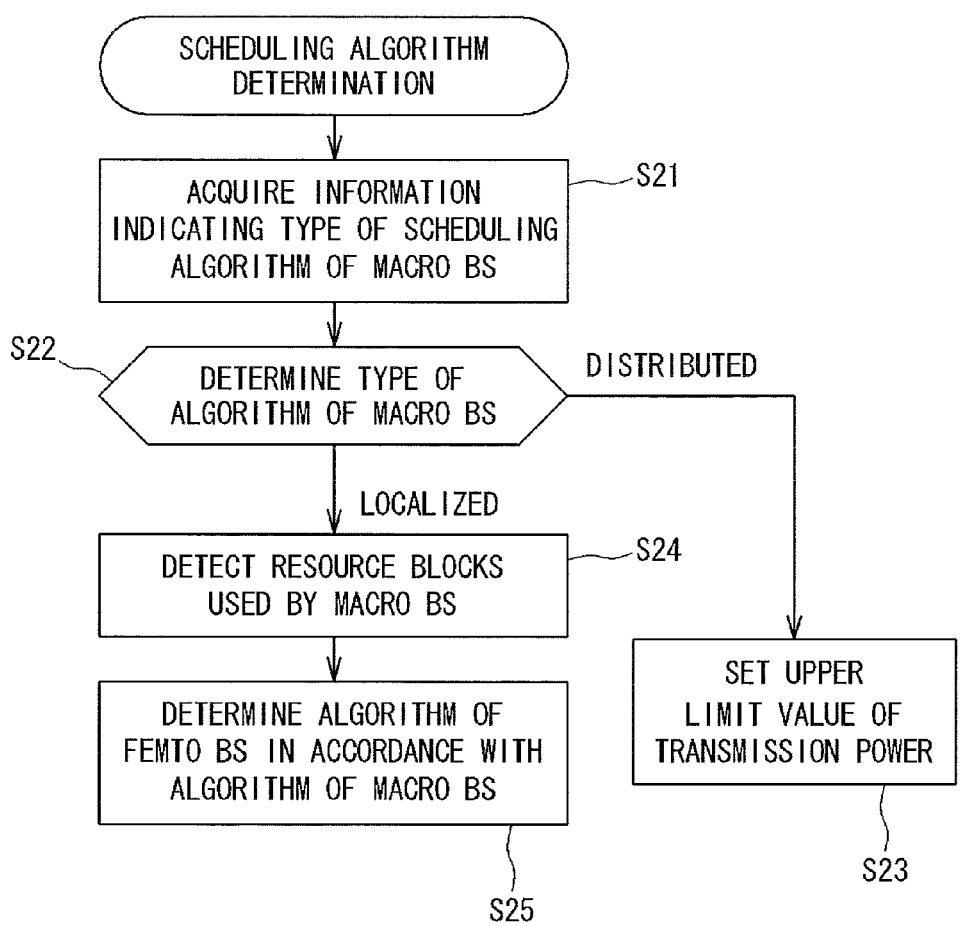
FIG. 8 is a diagram illustrating interference suppression control using scheduling algorithm information.

FIG. 8 illustrates the interference suppression control using the scheduling algorithm information indicating the type of the scheduling algorithm.

It is assumed that the base station device which stores the scheduling algorithm information as the base station information in the broadcast information and/or the paging information, and transmits the broadcast information and/or the paging information, is the macro base station device 1a. Further, it is assumed that the base station device which receives (sniffs) the broadcast information and/or the paging information in which the base station information is stored, and performs interference suppression control, is the femto base station device 1b.

The femto base station device 1b acquires the scheduling algorithm information as the base station information stored in the broadcast information and/or the paging information transmitted from the macro base station device 1a (step S21).

Subsequently, in order to determine the temporal variation in resource allocation in the macro cell, the femto base station device 1b determines the type of the scheduling algorithm in the macro base station device 1a, based on the scheduling algorithm information (step S22). When it is determined that the scheduling algorithm is distributed allocation in which the predictivity of resource allocation is very low, such as the RR, the femto base station device 1b performs control to reduce the upper limit value of the transmission power of the entirety of the used communication frequency band (step S23). The reason is as follows. In the distributed allocation, since the temporal variation in resource allocation is great, it is difficult to perform interference suppression control in units of resource blocks in accordance with the resource allocation scheme adopted by the macro base station device 1a. However, interference to the macro cell can be suppressed by reducing the transmission power.

On the other hand, when the scheduling algorism is the maximum CIR or the SPS in which any aspect of localized allocation is recognized, the resource blocks used by the macro base station device 1a are detected (step S24), and then the scheduling unit 26 in the femto base station device 1b performs scheduling in the femto base station device 1b in accordance with the algorithm corresponding to the algorithm adopted in the macro base station device 1a (step S25). The detection of resource blocks is performed by reading the resource allocation information in the macro base station device 1a from the downlink signal transmitted from the macro base station device 1a.

In step S25, when the algorithm adopted by the macro base station device 1a is the SPS, the resource blocks used in the macro cell are localized in a predetermined period of time. Therefore, in the femto base station device 1b, resource blocks other than those used in the macro cell are locally allocated based on the SPS. That is, even when the unused resource blocks in the macro cell are used for communication in the femto cell, no interference is caused in the macro cell.

In this way, if the femto base station device 1b is allowed to know the type of the scheduling algorithm adopted by the macro base station device 1a, interference to the macro base station device 1a can be suppressed by appropriately adjusting (the upper limit value of) the transmission power and the resource blocks to be used.

The following will describe the case where the base station information is the localized/distributed information.

The localized/distributed information is information indicating whether the radio resource allocation scheme is localized FDMA (localized arrangement) or distributed FDMA (distributed arrangement).

Figure 9:
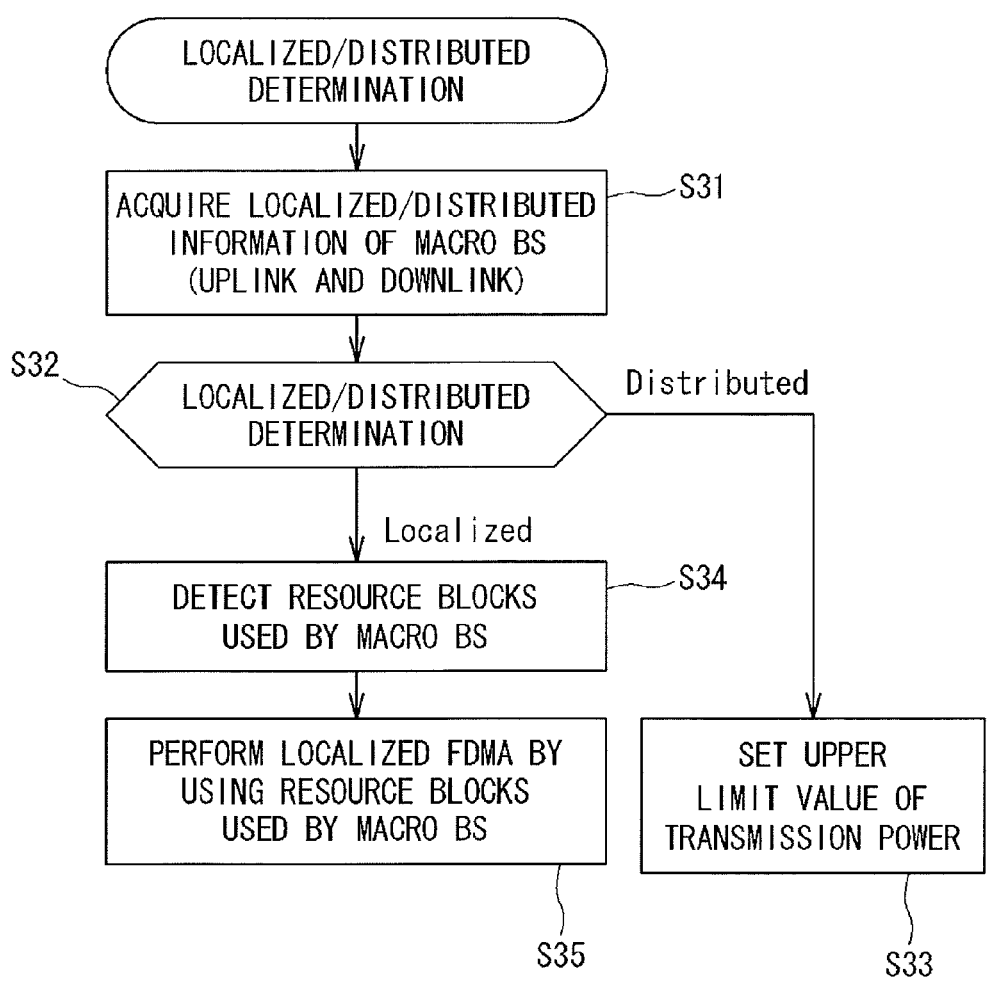
FIG. 9 is a diagram illustrating interference suppression control using localized/distributed information.

FIG. 9 illustrates the interference suppression control using the localized/distributed information.

Firstly, the femto base station device 1b acquires the localized/distributed information, as the base station information stored in the broadcast information and/or the paging information transmitted from the macro base station device 1a (step S31).

Subsequently, based on the localized/distributed information, it is determined whether the allocation scheme in the macro cell is the localized FDMA or the distributed FDMA (step S32). When it is determined in step S32 that the allocation scheme is the distributed FDMA, since the variation in resource allocation is great, it is difficult to perform the interference suppression control in units of resource blocks in accordance with the resource allocation scheme adopted by the macro base station device 1a. So, the interference suppression unit 36 having the power control function reduces the upper limit value of the transmission power over the entirety of the used communication frequency band, thereby suppressing interference to another cell (step S33).

On the other hand, when it is determined in step S32 that the resource allocation scheme adopted by the macro base station device 1a is the localized FDMA, resource blocks that are not used in the macro cell are detected (step S34).

Subsequently, the femto base station device 1b controls the scheduling unit 26 such that the resource allocation in the femto cell is also performed based on the localized FDMA (step S35). In this case, the unused resource blocks in the macro cell are locally used in the femto cell. It is possible to efficiently avoid interference by locally using, in the femto cell, the resource blocks that are not used in the macro cell, in response to that the resource allocation in the macro cell is localized.

The following will describe the case where the base station information is the information indicating the transmission power.

The femto base station device 1b acquires the information indicating the transmission power, as the base station information stored in the broadcast information and/or the paging information transmitted from the macro base station device 1a. This information allows the femto base station device 1b to detect the magnitude of the transmission power of the macro base station device 1a. In the femto base station device 1b, the detected transmission power is compared with a threshold. When the magnitude of the detected transmission power exceeds the threshold, interference is likely to occur. Therefore, the femto base station device 1b performs the same process as the above-described installation-location determination control to suppress occurrence of interference.

The following will describe the case where the base station information is the information indicating the number of antennae.

The femto base station device 1b acquires the information indicating the number of antennae, as the base station information stored in the broadcast information and/or the paging information transmitted from the macro base station device 1a. This information allows the femto base station device 1b to detect the antenna performance of the macro base station device 1a. When the number of antennae (antenna performance) detected by the femto base station device 1b is small (low), it is difficult for the macro base station device 1a to perform highly accurate wireless communication. Therefore, it is considered that the interference suppression ability of the macro base station device 1a is low. Therefore, the femto base station device 1b performs control to reduce the upper limit value of the transmission power, thereby suppressing interference.

As described above, according to the present invention, when broadcast information and/or paging information transmitted from a base station device to a terminal device is received by another wireless communication device, the another wireless communication device can acquire base station information (location information and the like) stored in the broadcast information and/or the paging information, and execute a process of suppressing interference by using the base station information. Therefore, even when a base station device (e.g., a femto base station device) is newly installed, if the base station device stores its own base station information (location information and the like) in broadcast information and/or paging information, and transmits the broadcast information and/or paging information, it is possible to suppress interference that might be caused by radio communication in its own cell or another cell.

In the above-described embodiments, the location information acquisition unit included in the base station device that transmits the location information is the GPS receiver. However, the base station device that transmits the location information may acquire its own location information by means other than the GPS receiver. For example, when a terminal device communicating with the base station device includes a GPS receiver, the terminal device is caused to move close to the base station device, and measure its own location. Then, the terminal device wirelessly transmits the acquired location information to the base station device. Upon receiving the location information, the location information acquisition unit in the base station device executes a process of regarding the location information (location) of the terminal device as its own location information (location). Thereby, the base station device can acquire its own location information without a GPS receiver.

In the above-described embodiments, the base station device that transmits the base station information (location information) is the femto base station device 1b.

However, the base station device that transmits the base station information (location information) may be the macro base station device 1a. In this case, the macro base station device 1a stores the location information indicating its own location, and the like, in the broadcast information and/or the paging information.

Further, as for the scheduling algorithm information and the localized/distributed information as the base station information, the macro base station device 1a may store these pieces of information in the broadcast information and/or the paging information to be transmitted, or the femto base station device 1b may store these pieces of information in the broadcast information and/or the paging information to be transmitted.

The embodiments disclosed are to be considered in all respects as illustrative and not restrictive. The scope of the invention is indicated by the appended claims rather than by the foregoing meaning, and all changes which come within the meaning and range of equivalency of the claims are therefore intended to be embraced therein.

1 Base station device
1a macro base station device
1b femto base station device
2 terminal device
2a macro terminal device
2b femto terminal device
4 transmission/reception unit (transmission unit)
5 signal processing unit
31 information storage unit
32 location information acquisition unit
35 separation unit
36 interference suppression unit
104 transmission/reception unit (transmission unit) in receiver-side base station device
105 signal processing unit in receiver-side base station device
131 information storage unit in receiver-side base station device
132 location information acquisition unit in receiver-side base station device
135 separation unit in receiver-side base station device
136 interference suppression unit in receiver-side base station device
42 transmission/reception unit (reception unit) in terminal device
44 signal processing unit in terminal device
45 separation unit in terminal device
46 terminal location information acquisition unit

The invention claimed is:

1. A base station device which is a femto base station device forming a femto cell, comprising:
   a transmission unit which stores broadcast information or paging information in a resource block which is a minimum unit of radio resource allocation for data transmission and transmits the broadcast information or the paging information to another device; and
   an information storage unit which adds and stores base station information relating to the base station device in the broadcast information or the paging information which is stored in the resource block, wherein
   an area in which the information storage unit stores the base station information is an area in which information relating to the name of the base station device is freely set and stored in the resource block.

2. The base station device according to claim 1, wherein the base station information includes location information relating to the location of the base station device.

3. A receiver-side base station device, comprising:
   a reception unit which receives the broadcast information or the paging information in which the base station information is stored, the broadcast information or the paging information having been transmitted from the transmission unit in the base station device according to claim 1; and
   a signal processing unit which executes an interference suppression process by using the base station information stored in the broadcast information or the paging information received by the reception unit.

4. The receiver-side base station device according to claim 3, wherein
   the base station information is location information relating to the location of the transmitter-side base station device, and
   the signal processing unit executes, as the interference suppression process, directivity control, transmission power control, or installation-location determination control that determines whether the installation location of the base station device is appropriate.

5. The receiver-side base station device according to claim 3, further comprising:
   a separation unit which separates the base station information from the broadcast information or the paging information in which the base station information is stored.

6. A terminal device which communicates with another base station device that forms a cell different from the cell of the base station device according to claim 1, the terminal device comprising:
   a reception unit which receives the broadcast information or the paging information in which the base station information is stored, the broadcast information or the paging information having been transmitted from the transmission unit in the base station device according to claim 1; and
   a signal processing unit which executes an interference suppression process by using the base station information stored in the broadcast information or the paging information received by the reception unit.

7. The terminal device according to claim 6, wherein
   the base station information stored in the broadcast information or the paging information received by the reception unit is base station location information relating to the location of the transmitter-side base station device that transmits the broadcast information or the paging information,
   the terminal device further comprises a terminal location information acquisition unit which acquires terminal location information relating to the location of the terminal device, and
   the signal processing unit performs, as the interference suppression process, a process of determining the location relationship between the transmitter-side base station device and the terminal device, based on the base station location information and the terminal location information, and notifying the user of the terminal device of information indicating the result of the determination.

8. The terminal device according to claim 6, further comprising:
   a separation unit which separates the base station information from the broadcast information or the paging information in which the base station information is stored.

9. A base station device, comprising:
   a transmission unit which stores broadcast information or paging information in a resource block which is a minimum unit of radio resource allocation for data transmission and transmits the broadcast information or the paging information to another device; and an information storage unit which adds and stores base station information relating to the base station device in the broadcast information or the paging information which is stored in the resource block, wherein an area in which the information storage unit stores the base station information is an area in which information relating to the name of the base station device is freely set and stored in the resource block, the base station information includes at least one of: scheduling algorithm information for allocation of radio resources to terminal devices communicating with the base station device; localized/distributed information relating to an allocation scheme of radio resources to the terminal devices communicating with the base station device; information indicating a transmission power by the transmission unit; and information indicating the number of antennae of the base station device, and the base station information which is set and stored in the resource block is the information which is known by only the corresponding base station device, and does not change in real time.

10. A wireless communication method, comprising the steps of:

adding by a base station device, base station information relating to the base station device in broadcast information or paging information and storing the base station information in a resource block which is a minimum unit of radio resource allocation for data transmission;

transmitting, by the base station device, the broadcast information or the paging information in which the base station information is stored to another device; and receiving, by a wireless communication device in another cell, the broadcast information or the paging information in which the base station information is stored, and executing an interference suppression process, wherein an area in which the base station information is stored is an area in which information relating to the name of the base station device is freely set and stored in the resource block in the steps storing the base station information.

* * * * *